United States Patent
Fricker et al.

(10) Patent No.: US 12,350,599 B2
(45) Date of Patent: Jul. 8, 2025

(54) PROVIDING CONTENT BASED ON A TRIGGER FROM A USER DEVICE

(71) Applicant: Disney Enterprises, Inc., Burbank, CA (US)

(72) Inventors: Blake A. Fricker, Oxford, FL (US); Peter Stepniewicz, Altadena, CA (US); Thomas F. Johnson, Winter Garden, FL (US); Thomas Arthur, Orlando, FL (US); John K. Lewis, Clermont, FL (US); Steven C. Eaton, Winter Garden, FL (US); Octavian Petrescu, Montreal (CA); Jackson Dunstan, Glendale, CA (US); Michael M. Gonterman, Oakland, FL (US); Sara Thacher, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 292 days.

(21) Appl. No.: 18/146,377

(22) Filed: Dec. 24, 2022

(65) Prior Publication Data
US 2024/0207748 A1 Jun. 27, 2024

(51) Int. Cl.
*A63F 13/20* (2014.01)
*A63G 31/16* (2006.01)
(Continued)

(52) U.S. Cl.
CPC ............ *A63G 33/00* (2013.01); *A63G 31/16* (2013.01); *H04W 4/029* (2018.02); *H04W 4/38* (2018.02)

(58) Field of Classification Search
CPC ........ A63F 13/20; A63F 13/21; A63F 13/216; A63F 13/217; A63F 13/28; A63F 13/44;
(Continued)

(56) References Cited

U.S. PATENT DOCUMENTS

| | | | |
|---|---|---|---|
| 7,749,089 B1 * | 7/2010 | Briggs | A63F 13/23 472/136 |
| 8,175,530 B2 | 5/2012 | Kane et al. | |

(Continued)

OTHER PUBLICATIONS

Natasa Durdevic et al., An Approach to Assessing Shopper Acceptance of Beacon Triggered Promotions in Smart Retail, MDPI, Sustainability 2022, 14, 3256, Mar. 10, 2022, pp. 1-25.
(Continued)

*Primary Examiner* — Omkar A Deodhar
(74) *Attorney, Agent, or Firm* — Foley & Lardner LLP

(57) ABSTRACT

An interaction system may receive trigger information associated with a facilitator device of a facilitator at a venue. The trigger information may be transmitted based on the facilitator operating the facilitator device during an interaction between the facilitator and one or more participants. The interaction system may determine, based on receiving the trigger information, that interaction information has been provided to the one or more participants. The interaction system may determine, in response to the trigger information, that the facilitator was located at a particular sensing location. The interaction system may obtain, using sensing location information identifying the particular sensing location, participant device information regarding a participant device located at the particular sensing location during the interaction. The interaction system may modify a record associated with the participant device to reflect that the interaction information was provided to a participant associated with the participant device during the interaction.

20 Claims, 10 Drawing Sheets

(51) Int. Cl.
*A63G 33/00* (2006.01)
*H04W 4/029* (2018.01)
*H04W 4/38* (2018.01)

(58) Field of Classification Search
CPC .......... A63F 13/45; A63F 13/70; A63F 13/79; A63G 33/00; A63G 31/16; H04W 4/029; H04W 4/38
See application file for complete search history.

(56) References Cited

U.S. PATENT DOCUMENTS

| | | | |
|---|---|---|---|
| 9,744,462 B2* | 8/2017 | Dutilly | A63F 13/79 |
| 9,875,588 B2 | 1/2018 | McCollum et al. | |
| 10,173,140 B2* | 1/2019 | Van Briggle | H04W 4/021 |
| 10,685,383 B2 | 6/2020 | Soni et al. | |
| 10,861,267 B2* | 12/2020 | Aman | G07C 9/215 |
| 11,033,821 B2* | 6/2021 | Mullen | A63F 13/42 |
| 2016/0217496 A1 | 7/2016 | Tuchman et al. | |
| 2016/0294958 A1* | 10/2016 | Zhang | H04W 4/02 |
| 2022/0236072 A1* | 7/2022 | Jones | H04W 4/38 |

OTHER PUBLICATIONS

You-Wei Lin et al., An Interactive Real-Time Locating System Based on Bluetooth Low-Energy Beacon Network, MDPI, Sensors 2018, 18, 1637, May 21, 2018, pp. 1-17.

Giorgio Conte, BlueSentinel: a first approach using iBeacon for an energy efficient occupancy detection system, ResearchGate, Conference Paper, Nov. 2015, pp. 1-10.

Nilima A. Dudhane et al., Location Based and Contextual Services Using Bluetooth Beacons: New Way to Enhance Customer Experience, Lecture Notes on Information Theory vol. 3, No. 1, Jun. 2015, pp. 1-4.

* cited by examiner

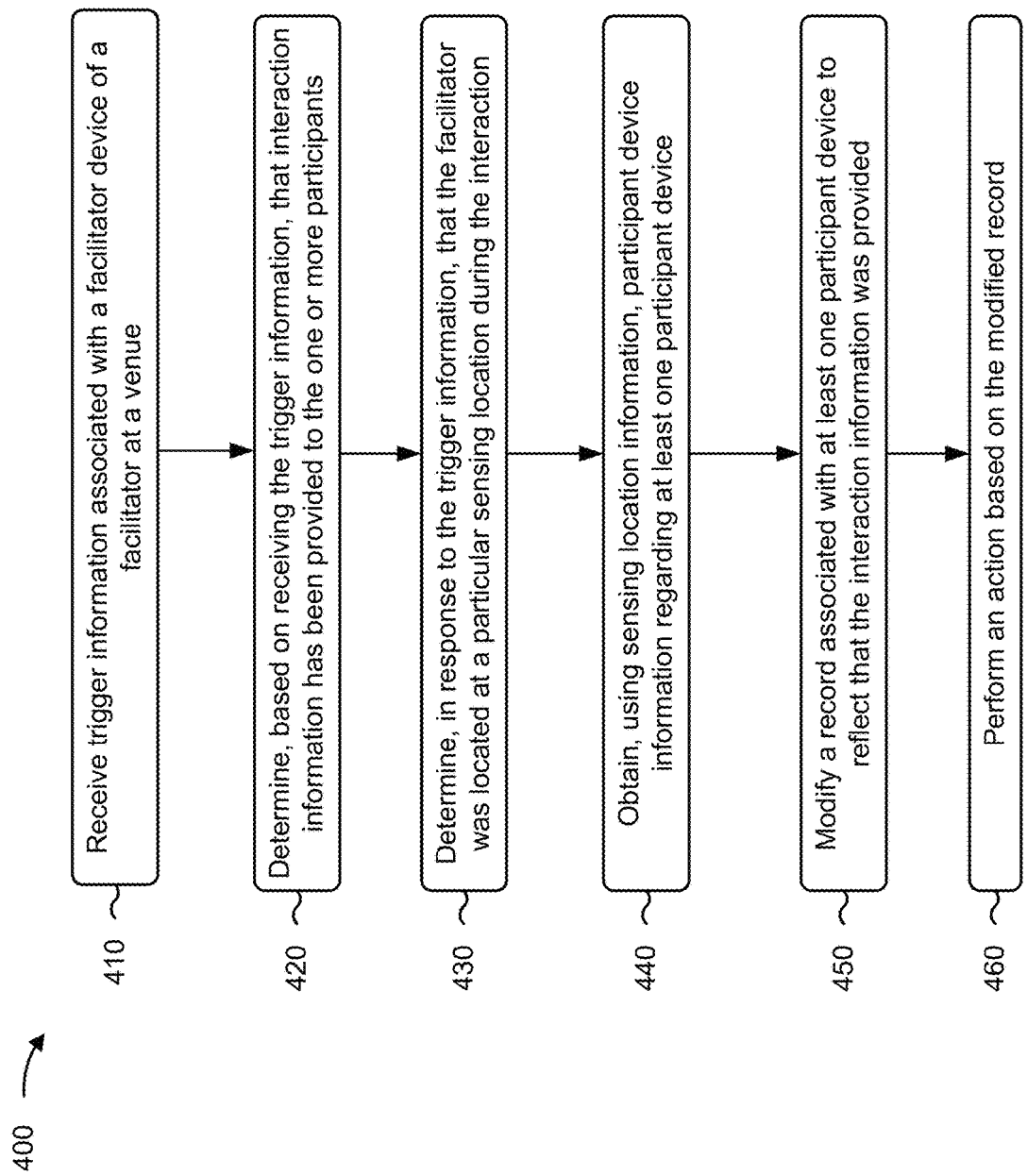

PROVIDING CONTENT BASED ON A TRIGGER FROM A USER DEVICE

BACKGROUND

A user device may provide a request for content. The content may include images, video, audio, special effects, lighting and the like. The user device may process the content and provide the content to a user of the user device or others.

SUMMARY

In some implementations, a method performed by an interaction system includes receiving trigger information associated with a facilitator device of a facilitator at a venue, wherein the trigger information is transmitted based on the facilitator operating the facilitator device during an interaction between the facilitator and one or more participants; determining, based on receiving the trigger information, that interaction information has been provided to the one or more participants during the interaction; determining, in response to the trigger information, that the facilitator was located at a particular sensing location, of a plurality of sensing locations at the venue, during the interaction; obtaining, using sensing location information identifying the particular sensing location, participant device information regarding at least one participant device located at the particular sensing location during the interaction, modifying a record associated with at least one participant device to reflect that the interaction information was provided to at least one of the one or more participants associated with the at least one participant device; and performing an action based on the modified record.

In some implementations, a system includes a sensing management system configured to: receive trigger information associated with a facilitator device of a facilitator at a venue, wherein the trigger information is transmitted based on the facilitator operating the facilitator device during an interaction between the facilitator and a participant, and determine, in response to the trigger information, that the facilitator device is located at a particular sensing location of a plurality of sensing location of the venue; and an interaction system configured to: receive, from the sensing management system, the trigger information and sensing location information identifying the particular sensing location, obtain, using the sensing location information, participant device information regarding at least one participant device located at the particular sensing location during the interaction, wherein the at least one participant device includes a participant device of the participant; determine, based on receiving the trigger information, that first interaction information has been provided to the participant during the interaction; modify a record associated with the at least one participant device to reflect that the interaction information was provided to at least one participant; and provide second interaction information to the at least one participant device based on determining that the first interaction has been provided.

In some implementations, a non-transitory computer-readable medium storing a set of instructions includes one or more instructions that, when executed by one or more processors of a device, cause the device to: store participant device information regarding a plurality of participant devices located at a venue; receive trigger information associated with a facilitator device of a facilitator located at the venue, wherein the trigger information is received based on the facilitator interacting with the facilitator device during an interaction between the facilitator and a participant; determine, based on the trigger information, that first interaction information was provided to the participant during the interaction; determine, in response to the trigger information, that the facilitator was located at a particular sensing location, at the venue, during the interaction; obtain, using sensing location information identifying the particular sensing location, a portion of the participant device information regarding at least one participant device located at the particular sensing location during the interaction, wherein the at least one participant device includes a participant device of the participant, and wherein the portion of the participant device information identifies the participant device of the participant; and provide, to the participant device, second interaction information related to the first interaction information.

BRIEF DESCRIPTION OF THE DRAWINGS

FIG. 4 is a flowchart of an example process relating to providing content based on a trigger from a user device.

DETAILED DESCRIPTION OF PREFERRED EMBODIMENTS

Figure 1A:
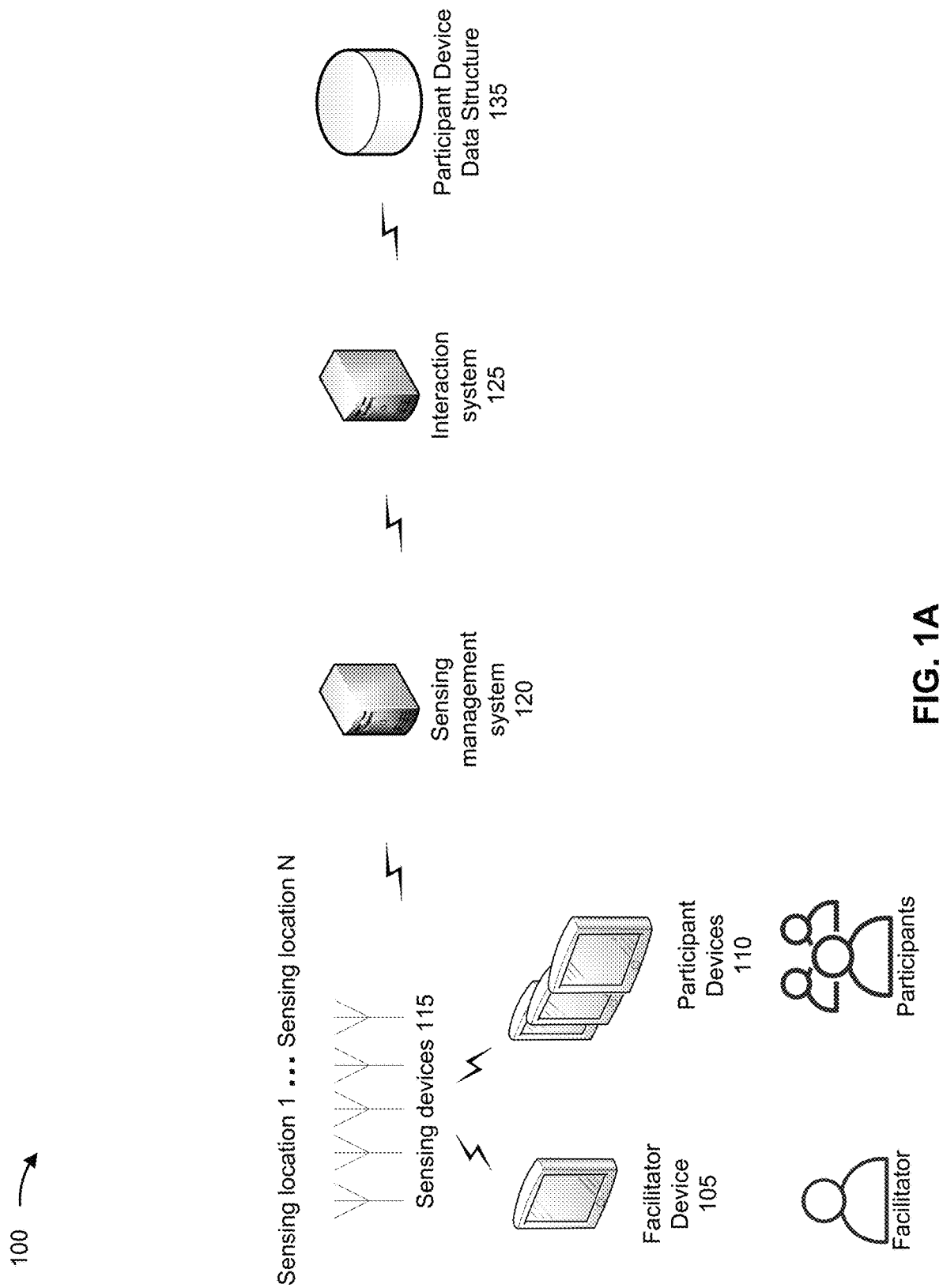
FIGS. 1A-1G are diagrams of an example associated with providing content based on a trigger from a user device.

The following detailed description of example implementations refers to the accompanying drawings. The same reference numbers in different drawings may identify the same or similar elements.

Participants may attend an event at a venue. Within a venue of any size, an individual's personal experiences are somewhat unique to events and activities that take place at particular places within the venue and at particular times visited by the participant.

Currently, devices of the venue are not able to accurately singulate participants in a particular location (i.e., determine when a particular individual or particular small group of individuals are present at a particular location within a venue where and when an event or activities occur). Hence, it is difficult to determine what events a particular participant experienced while attending the venue.

In some situations, content is provided to a device of the particular participant based on the events the particular participant experienced while attending the venue. Because of the difficulty in determining the events the particular participant experienced, incorrect content may be identified and provided to the device of the particular participant. Accordingly, resources may be wasted in identifying the incorrect content and providing the incorrect content to the device of the particular participant. The resources may include computing resources (e.g., associated with identifying the incorrect content), storage resources (e.g., associated with storing the incorrect content), network resources (e.g., associated with providing the incorrect content to the device of the particular participant), among other examples.

Implementations described herein are directed to determining which participants are located at a particular location of a venue at a particular point in time (or span of time) and performing an action based on determining the participants who are located at the particular location. For example, an interaction system may receive trigger information associated with a first user device of a first user at a venue. The first user may be a tour guide, an actor, a vendor, another participant or the like. The trigger information may be received based on the first user operating the first user device during an interaction between the first user and one or more second users. The second users may be passive or active participants in events that take place at the venue, spectators, shoppers, or other guests of the venue. The first user may be hereinafter referred to as a facilitator (or an event facilitator) and the second users may be hereinafter referred to as participants. Based on receiving the trigger information, the interaction system may determine that interaction information was provided by the facilitator to the one or more participants during the interaction.

In some examples, the trigger information may be obtained from the facilitator device by one or more sensing devices located at a particular sensing location of a plurality of sensing locations of the venue. The sensing locations are areas of the venue where the one or more sensing devices can communicate with the facilitator device and participant device(s), of one or more participants, sufficiently to precisely locate those participant device(s). An interaction space is an area within the venue where human interactions between the facilitator and one or more participants takes place, and fits within or is coterminous with a sensing location. The trigger information may include information identifying the facilitator, or identifying the role of the facilitator (e.g., a vendor role identification at a stadium, a photographer role identification at a wedding, a docent role at a museum and the like). The information identifying the facilitator may be of any desired specificity to meet the needs of a particular application and protect the personally identifying information of the facilitator. The trigger information may include sensing location information identifying the particular sensing location. The trigger information may include sensing time information indicating a particular time or time span at which an event occurred at the particular sensing location. Alternatively, the sensing location information and the sensing time information may be determined by the sensing device itself, and added to the trigger information. Based on the sensing location information, the interaction system may determine that the facilitator was located at the particular sensing location during the interaction.

The interaction system may determine at least one participant device that was located at the particular sensing location during the interaction (e.g., determine at least one participant device that was located at the particular sensing location during a specified snapshot or span in time). In some examples, the interaction system may obtain participant device information of the at least one participant device from a data structure. The interaction system may obtain the participant device information using time information associated with the trigger information (e.g., a time and/or a date when the trigger information was received by the interaction system). Additionally, or alternatively, the interaction action may cause the one or more sensing devices, located at the particular sensing location, to obtain the participant device information from participant device devices currently located at the particular sensing location.

Based on the participant device information, the interaction system may determine that the one or more participant devices were located at the particular sensing location during the interaction. Accordingly, the interaction system may determine that the interaction information was provided by the facilitator to the one or more participants, associated with the one or more participant devices, during the interaction. In this regard, the interaction system may create or modify a record indicating that the interaction occurred between the facilitator and the one or more participants and that the one or more participants received the interaction information.

For example, the record may indicate that the one or more participants had a particular experience and/or gained some particular knowledge, among other examples. The interaction system may perform an action based on the record. This record may be used immediately to advance a participant's state along a storyline, and/or used later to modify future interactions (e.g., avoid or acknowledge repeating information already given, give new information when the experience is a prerequisite to the new information, and/or offer discounts/incentives only to participants who have had a particular experience, among other examples).

In some implementations, the interaction system may determine content to be provided to the one or more participant devices. For instance, based on determining that the interaction information was provided to the one or more participants during the interaction, the interaction system may determine second interaction information related to the interaction information. The interaction system may cause the second interaction information to be provided to the one or more participant devices during a period of time following the interaction. Additionally, or alternatively, based on the interaction information, the interaction system may control one or more operations of one or more devices located at the venue. By identifying and providing the second interaction information, the interaction system may preserve the resources that would have been consumed by identifying and providing incorrect content.

FIGS. 1A-1G are diagrams of an example implementation 100 associated with providing content based on a trigger from a user device. As shown in FIGS. 1A-1G, example implementation 100 includes a facilitator device 105 of a facilitator, a plurality of participant devices 110 (individually "participant device 110") of a plurality of participants, a plurality of sensing devices 115 (individually "sensing device 115"), sensing management system 120, interaction system 125, facilitators data structure 130, and participant device data structure 135. These devices are described in more detail below in connection with FIG. 2 and FIG. 3.

Facilitator device 105 includes one or more devices capable of receiving, generating, storing, processing, and/or providing information associated with creating a record of an event taking place at a particular time. Facilitator device 105 may be configured to provide trigger information based on the facilitator operating facilitator device 105. For example, facilitator device 105 may include a physical button that may be physically depressed by the facilitator to cause facilitator device 105 to provide the trigger information. Alternatively, facilitator device 105 may include a virtual button, of a graphical user interface, that may be touched (e.g., virtually depressed) by the facilitator to cause facilitator device 105 to provide the trigger information. As another alternative, facilitator device 105 may recognize a gesture made by or a speech pattern uttered by the facilitator to provide the trigger information.

The trigger information may indicate that the facilitator has provided interaction information to one or more participants (of the plurality of participants) during an interaction between the facilitator and the one or more participants. The trigger information may be provided without the knowledge of the one or more participant. The trigger information may identify the facilitator, the time of the interaction, the location of the interaction, and/or any semantic meaning of the interaction (e.g., a sales contact, a customer concern, information provided, completion of a task, and the like). The interaction information may be related to content provided at the venue, activities performed at the venue, among other examples.

Facilitator device 105 may include a communication device and a computing device. For example, the facilitator device 105 may include a wireless communication device, a mobile phone, a user equipment, or a similar type of device.

Participant device 110 includes one or more devices capable of receiving, generating, storing, processing, and/or providing information identifying participant device 110 (e.g., a unique identifier of participant device 110) to a sensing device 115. As an example, participant device 110 may provide the information identifying participant device 110 via a Bluetooth low energy (BLE) advertisements. In some situations, the information identifying participant device 110 may be provided based on a command (e.g., an inquiry) from a sensor device 115. For example, the inquiry from the sensor device 115 may cause participant device 110 to issue a response that includes the information identifying participant device 110.

Participant device 110 may be kept in a low power listen mode rather than continuously broadcasting the information identifying participant device 110. Participant device 110 may include a communication device and a computing device. For example, participant device 110 may include a wireless communication device, a wearable communication device (e.g., a smart wristwatch, a pair of smart eyeglasses, a head mounted display, or a virtual reality headset), a mobile phone, a user equipment, or a similar type of device.

Sensing device 115 includes one or more devices capable of receiving information from facilitator device 105 and/or from participant device 110 and capable of processing and providing the information to sensing management system 120. The information may include the trigger information from facilitator device 105 and a unique identifier of the participant device(s) 110. In some implementations, sensing devices 115 may obtain the information from facilitator device 105 and/or from participant device 110 periodically (e.g., every thirty seconds, every minute, every three minutes, among other examples). Alternatively, sensing devices 115 may obtain the information from facilitator device 105 and/or from participant device 110 based on a trigger (e.g., based on a request from sensing management system 120, based on a request from interaction system 125, among other examples). In some implementations, a sensing device 115 may provide a command (e.g., an inquiry) to a facilitator device 105 and/or a participant device 110. The command may cause the facilitator device 105 and/or the participant device 110 to issue a response that includes the information. In this regard, the sensing device 115 may function as a radio frequency identification (RFID) reader.

In some examples, sensing devices 115 may include antennas. For instances, sensing devices 115 may include one or more directional antennas and/or one or more omni directional antennas. Additionally, or alternatively, sensing devices 115 may obtain the information using other sensing methods. For example, sensing devices 115 may obtain the information using a visual sensing method, an auditory sensing method, a thermal sensing method, and/or a recognition algorithm. The recognition algorithm may include a facial recognition algorithm, a speech recognition algorithm, a gait recognition algorithm, among other examples. Sensing devices 115 may be provided at different locations of the venue. For example, one or more first sensing devices 115 may be provided at a first sensing location of the venue, one or more second sensing devices 115 may be provided at a second sensing location of the venue, and so on.

In some implementations, a rate at which sensing devices 115 obtains information from facilitator device 105 and/or participant device 110 may be based on a sensing location. For example, a rate associated with the first sensing location may exceed the rate associated with the second sensing location if the first sensing location is within a distance threshold of another sensing location while the second sensing location is not within the distance threshold of another sensing location. Higher rate sensing can be used to improve singulation and localization performance. Facilitator devices 105 and/or participant devices 110 may have hardware and programming that enable the rate at which information is sent to sensing devices 115 to be dynamically altered under control of sensing devices 115 or sensing management system 120. In this manner, particular locations within a venue can be controllably activated to improve the singulation and localization performance in the particular location as compared to other locations of the venue. This might be done programmatically, or based on the trigger signal from a facilitator device 105 so as to improve accuracy in the particular location during the time an event will occur. In some implementations, the rate associated with a sensing location may be based on a system utilizing the information obtained by the sensing devices 115 of the sensing location. For example, a rate associated with a first sensing location for a first system associated with a faster moving attraction may be faster than a rate associated with a second sensing location for a second system associated with a slower moving attraction.

Sensing management system 120 includes one or more devices capable of receiving, generating, storing, processing, and/or providing information associated with providing content based on a trigger from a user device (e.g., facilitator device 105). For example, sensing management system 120 may be configured to receive, from sensing devices 115, the information obtained by sensing devices 115 from facilitator device 105 and/or participant device 110. In some examples, sensing management system 120 may be configured to control an operation of sensing devices 115 (e.g., cause sensing devices 115 to provide the information obtained from facilitator device 105 and/or participant device 110).

Sensing management system 120 may be configured to analyze the information to determine the locations of sensing devices 115. As an example, sensing management system 120 may perform a singulation operation, using the information, to determine the locations of sensing devices 115. Distributed sensing devices 115 may assist in singulating and localizing facilitator devices 105 and participant devices 110 within a venue. This can be done by comparing received signal strength (RSSI) amongst the various sensing devices 115. In turn, the signal strength comparison can be used to triangulate the specific location of a facilitator device 105 and/or participant device 110. Alternatively, time of flight or other singulation and localization techniques can be implemented by distributed sensing devices 115. The locations of sensing devices 115 may indicate a location of facilitator device 105 and/or a location of participant device 110. Sensing management system 120 may provide the information regarding facilitator device 105 and/or participant device 110 along with sensing location information identifying the locations of sensing devices 115.

Interaction system 125 includes one or more devices capable of receiving, generating, storing, processing, and/or providing information associated with providing content based on a trigger from a user device (e.g., facilitator device 105). In some implementations, based on the trigger information, interaction system 125 may determine that interaction information has been provided to one or more participants.

Interaction system 125 may determine information, related to the interaction information, and provide the related information to one or more participant devices 110 of the one or more participants. Additionally, or alternatively, interaction system 125 may store, in participant device data structure 135, the participant device information regarding the one or more participant devices 110 to update participant device data structure 135. Additionally, or alternatively, interaction system 125 may control operations of one or more devices based on the trigger information and/or the interaction information.

In some implementations, interaction system 125 may store, in a memory, information regarding a facilitator. The information may include information identifying the facilitator (specifically or by role, avatar, handle or the like), device information identifying facilitator device 105 of the facilitator, information identifying one or more sensing locations at the venue and information identifying one or more periods of time associated with the one or more sensing locations, information identifying interaction information associated with each period of time, among other examples.

The information identifying the facilitator may include a username, a name, and/or an identifier, among other examples. In some applications information identifying the facilitator specifically is not necessary as a facilitator device 105 may be assigned to a defined role such as a caterer, an usher, a docent, etc., in which case information regarding the facilitator described herein may only require an identification of the role. The device information may include a unique identifier of facilitator device 105, a network address (e.g., a media access control (MAC address), a serial number, and/or information identifying a manufacturer, among other examples. In some implementations, the unique identifier may be an administratively programmed identifier (e.g., an identifier determined by an administrator of interaction system 125). In some examples, the facilitator may be scheduled to be located at different sensing locations during different periods of time. For example, the facilitator may be scheduled to be located at a first sensing location during a first period of time, located at a second sensing location during a second period of time, and so on. Accordingly, as an example, the memory may store information identifying the first sensing location in association with information identifying the first period of time, information identifying the second sensing location in association with information identifying the second period of time, among other examples.

In some examples, the facilitator may be instructed to provide different interaction information during the different periods of time. Accordingly, as an example, the memory may store first interaction information in association with the first period of time and along second interaction information related to the first interactions, store third interaction information in association with the second period of time and along fourth interaction information related to the third interaction information, and so on.

Participant device data structure 135 a data structure (e.g., a database, a table, and/or a linked list) that stores participant device information regarding one or more participant devices 110 of one or more participants. The participant device information may be obtained by sensing devices 115. As an example, the participant device information regarding a particular participant device 110 (of a particular participant) may include device information identifying the particular participant device 110 (e.g., a unique identifier of the particular participant device 110), information identifying a sensing location at which the particular participant device 110 was located when the participant device information was obtained by sensing devices 115, and/or an indication of the nature or meaning of the participant device information that was obtained, among other examples. As a specific example, in a museum venue the participant device information may be that a docent (e.g., a facilitator) told a historical story about a particular exhibit to a small group of visitors (e.g., participants). In this case, the participant device data structure 135 may contain a record that indicates the time the historical story was told, information about the docent, information about the location of the interaction, and perhaps information enumerating all of the participant devices 110 that were present at the location during the exchange (e.g., unique identifiers of participant devices 110 that were present at the location during the exchange). The interaction information, provided by the docent during the interaction, may include the historical story.

Figure 1B:
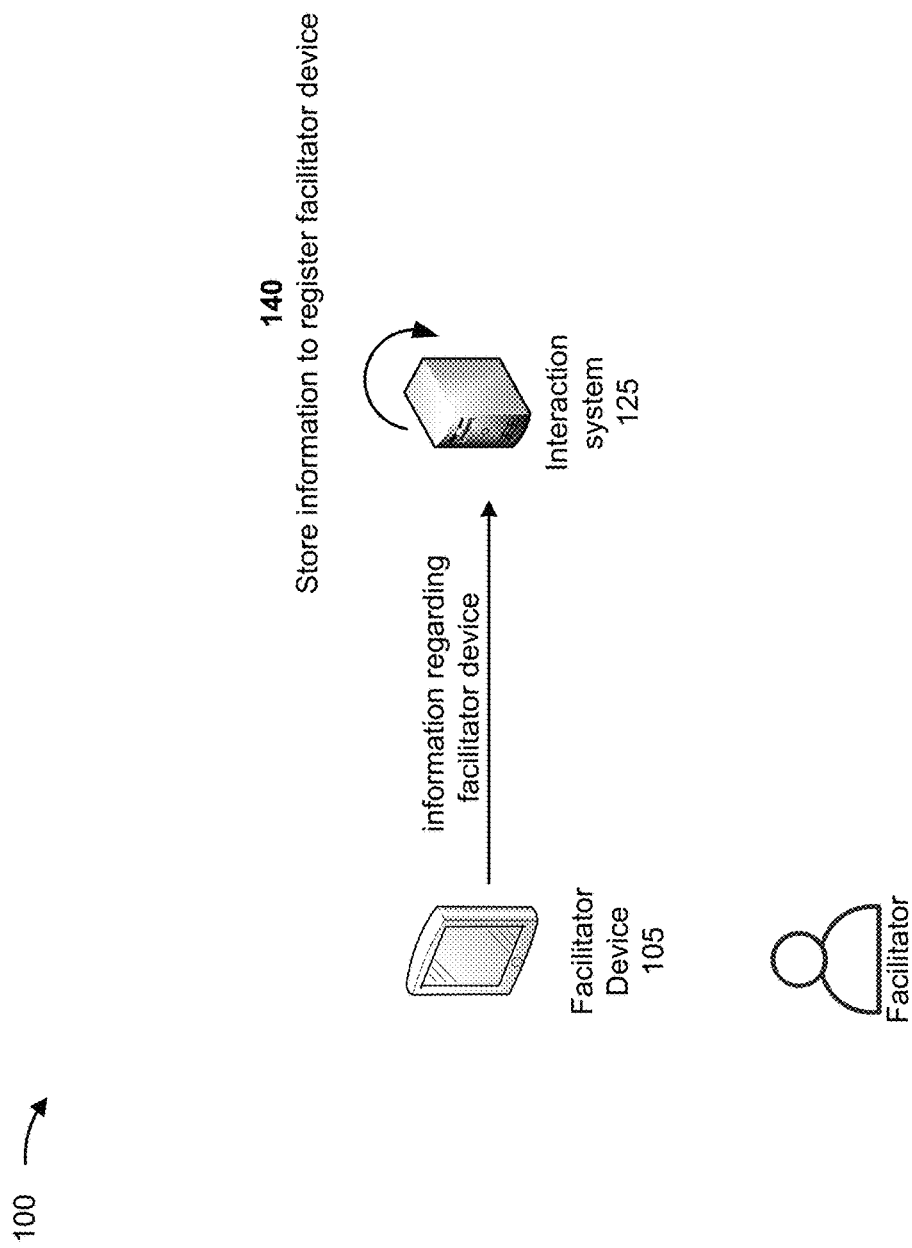

As shown in FIG. 1B, and by reference number 140, interaction system 125 may store information to register facilitator device 105. For example, the facilitator may cause facilitator device 105 to provide the information regarding facilitator device 105 to interaction system 125 to cause interaction system 125 to register facilitator device 105. Interaction system 125 may store the information regarding facilitator device 105 in the memory of interaction system 125 to register facilitator device 105.

In some implementations, the information may include the information identifying the facilitator and the device information identifying facilitator device 105. In other implementations the facilitator may remain anonymous and the registration includes only the role of the facilitator, or a pseudonym. Additionally, or alternatively, the information may include the information identifying the one or more sensing locations associated with the facilitator, the information identifying the one or more periods of time, and/or the different interaction information.

Figure 1C:
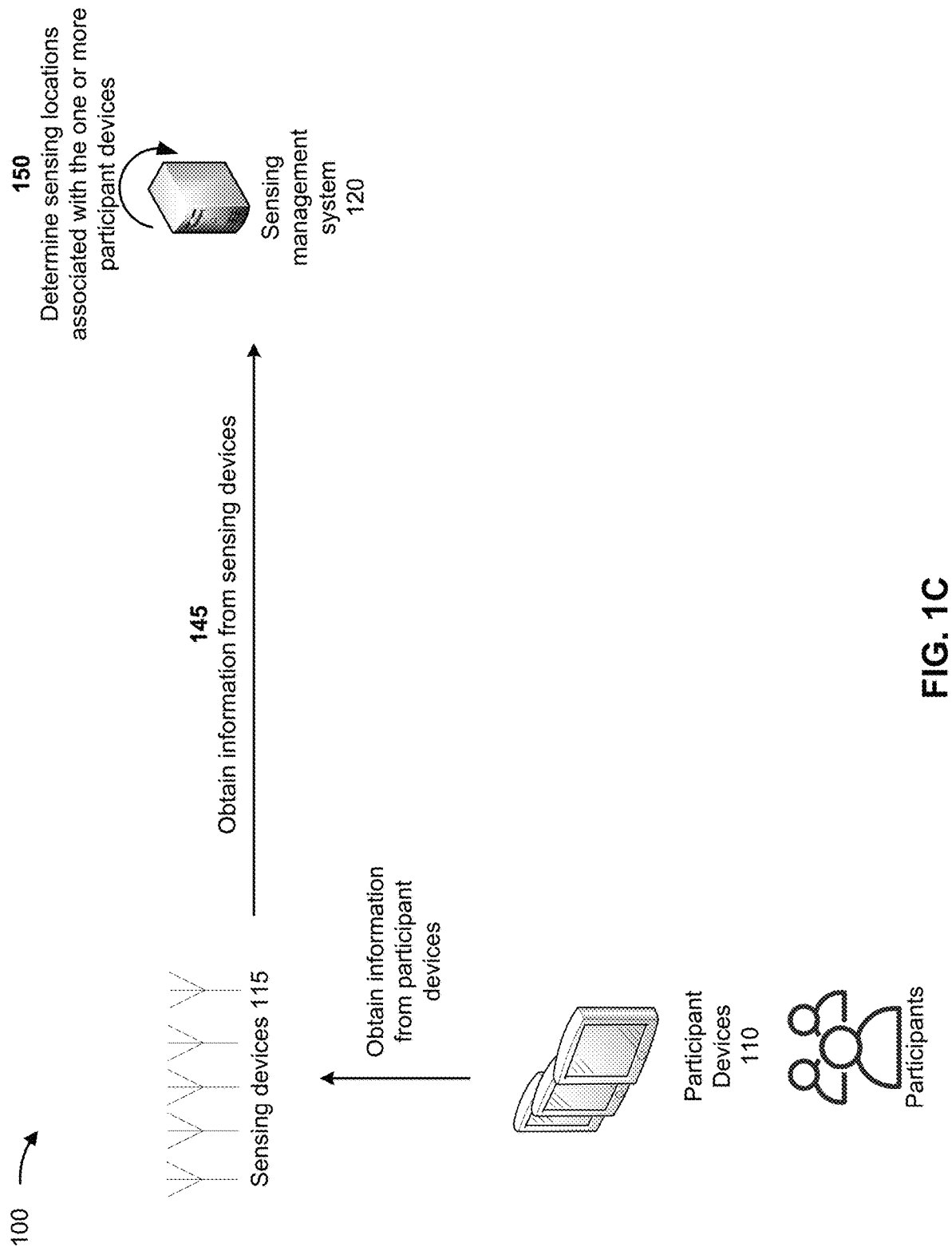

As shown in FIG. 1C, sensing devices 115 may obtain information from one or more participant devices 110. Sensing devices 115 may be located at a single sensing location. Alternatively, sensing devices 115 may be located at multiple sensing locations. In some implementations, sensing devices 115 may obtain the information via BLE advertisements. As an example, each participant device 110 may provide one or more BLE advertisements. A BLE advertisement may include the device information identifying participant device 110 (e.g., a unique identifier of participant device 110) and/or information identifying a signal strength of the BLE advertisement, among other examples. In some implementations, sensing devices 115 may obtain the information using an RFID protocol (e.g., an active RFID protocol). For example, a participant device 110 may include an RFID tag that transmits the information and sensing devices 115 may include RFID readers (or receivers) that receive the information. In some instances, the participant device 110 may include an ultra-wideband RFID tag.

As shown in FIG. 1C, and by reference number 145, sensing management system 120 may obtain the information from sensing devices 115. For example, sensing devices 115 may provide the information obtained from the one or more participant devices 110, to sensing management system 120.

In some instances, the information provided by a sensing device 115 may include information identifying the sensing device 115 and/or a location of the sensing device 115. The location of the sensing device 115 may be information that explicitly indicates coordinates of the sensing device 115 in a coordinate system, or it may merely be a name given to the sensing device 115. The identifying information itself may implicitly provide the location if the sensing device 115 is in a fixed location and that location is previously known to sensing management system 120.

As shown in FIG. 1C, and by reference number 150, sensing management system 120 may determine sensing locations associated with the one or more participant devices 110. In some implementations, sensing management system 120 may determine the sensing locations based on the signal strengths of the BLE advertisements as received by one or more sensing device(s) 115.

For example, for a particular participant device 110, sensing management system 120 may identify the one or more BLE advertisements provided by the particular participant device 110. In some implementations, sensing management system 120 may perform a singulation operation, using the one or more BLE advertisements, to determine the precise location of each participant device 110 that is proximate a sensing location associated with one or more sensing devices 115.

In some instances, sensing management system 120 may determine the signal strength of BLE advertisements provided by the particular participant device 110 based on the information identifying the signal strength included in the BLE advertisement. Sensing management system 120 may determine a highest signal strength out of the signal strengths of BLE advertisements provided by the particular participant device 110. Sensing management system 120 may determine a particular sensing device 115 associated with the highest signal strength based on the information identifying the particular sensing device 115 (e.g., included in the BLE advertisement).

Sensing management system 120 may obtain information identifying a particular sensing location that includes the particular sensing device 115 using the information identifying the particular sensing device 115. In some examples, sensing management system 120 may obtain the information identifying the particular sensing location from a data structure that stores information identifying each sensing device 115 in association with information identifying a sensing location that includes the sensing device 115. Sensing management system 120 may determine that the particular sensing location is associated with the particular participant device 110.

Sensing management system 120 may perform similar actions to determine the sensing locations of other participant devices 110. Additionally, or alternatively, to determining a highest signal strength, sensing management system 120 may determine a signal strength that satisfies a signal strength threshold. Alternatively or in addition sensing management system 120 may determine a time-of-flight (ToF) for the BLE advertisements by comparing a transmission time included in the BLE advertisement with a reception time at the sensing device 115 in which case the sensing management system may determine a ToF that satisfies a threshold. In either signal strength or ToF cases, sensing management system 120 may use information from multiple sensing devices 115 to triangulate or otherwise determine a more precise location for participant devices 110 based on comparative signal strength or ToF readings. In some implementations, an ultra-wideband RFID tag (mentioned above) may be used to determine (e.g., triangulate) the position of the ultra-wideband RFID tag based on ToF readings.

Figure 1D:
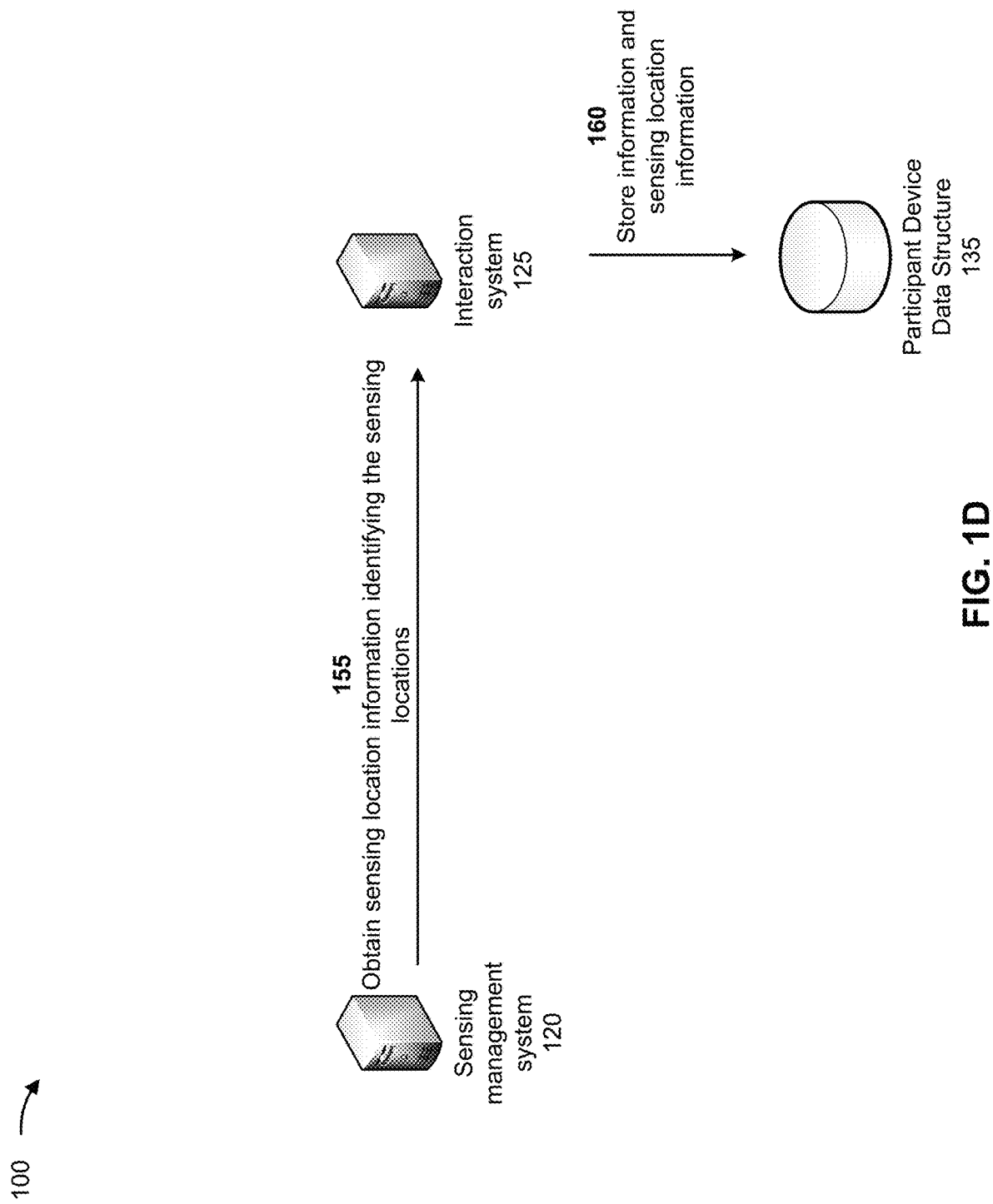

As shown in FIG. 1D, and by reference number 155, interaction system 125 may obtain sensing location information identifying the sensing locations. For example, after determining the sensing locations associated with participant devices 110, sensing management system 120 provides the information obtained from sensing devices 115 and the sensing location information identifying the sensing locations to interaction system 125. In some implementations, sensing management system 120 may provide the information and the sensing location information periodically. Additionally, or alternatively, sensing management system 120 may provide the user information and the sensing location information based on a request from interaction system 125.

As shown in FIG. 1D, and by reference number 160, interaction system 125 may store the information obtained from sensing devices 115 and the sensing location information. For example, interaction system 125 may store the information obtained from sensing devices 115 and the sensing location information as participant device information in participant device data structure 135. Interaction system 125 may store the participant device information in participant device data structure 135 to update information regarding which participant devices 110 are present in a particular sensing location.

Figure 1E:
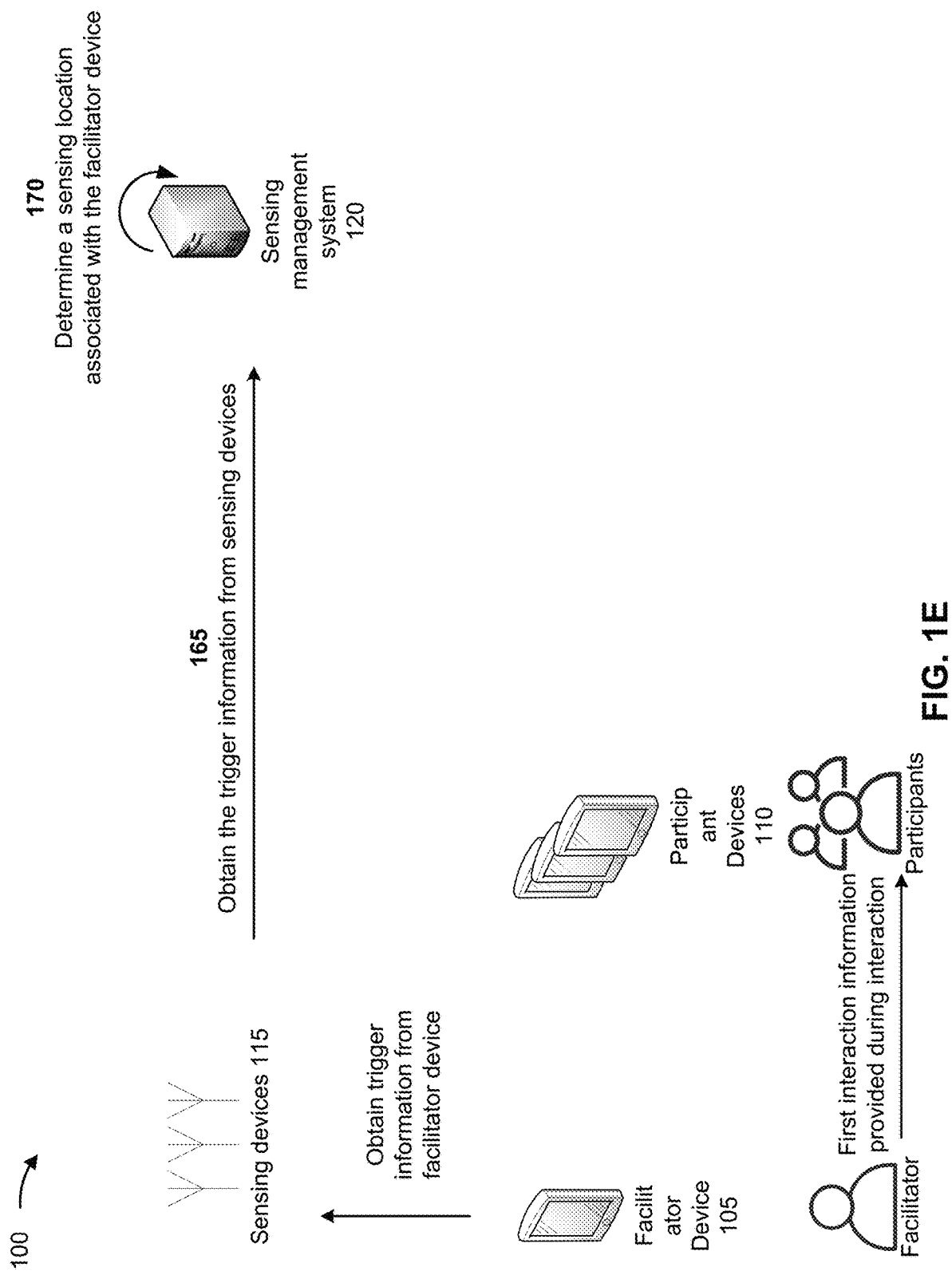

As shown in FIG. 1E, the facilitator may interact with one or more participants. The interaction may occur at any time. The facilitator may provide first interaction information to the one or more participants. In some implementations, the first interaction information may be based on certain information being provided or certain activities or events that occur in the sensing location when the second users are present.

Facilitator device 105 may provide the trigger information via one or more BLE advertisements. A BLE advertisement may include the device information identifying facilitator device 105, an indication that interaction information (e.g., the first interaction information) has been provided, information identifying a signal strength of the BLE advertisement, information identifying an amount of battery charge remaining for facilitator device 105, and/or information identifying a packet length associated with the BLE advertisement, among other examples. In some implementations, facilitator device 105 may provide the trigger information in accordance with a defined messaging protocol.

As shown in FIG. 1E, sensing devices 115 may obtain the trigger information. Sensing devices 115 may be located in a single sensing location. Alternatively, sensing devices 115 may be located in multiple sensing locations. Also, multiple sensing devices 115 may be located in a single sensing location.

As shown in FIG. 1E, and by reference number 165, sensing management system 120 may obtain the trigger information from sensing devices 115. In some examples, sensing devices 115 may provide the trigger information to sensing management system 120 periodically. Alternatively, sensing devices 115 may provide the trigger information to sensing management system 120 based on a request from sensing management system 120 and/or based on a request from interaction system 125, among other examples.

As shown in FIG. 1E, and by reference number 170, sensing management system 120 may determine a sensing location associated with facilitator device 105. For example, after receiving the trigger information from sensing devices 115, sensing management system 120 may determine the sensing location associated with facilitator device 105 in a manner similar to the manner described above in connection with FIG. 1C.

Figure 1F:
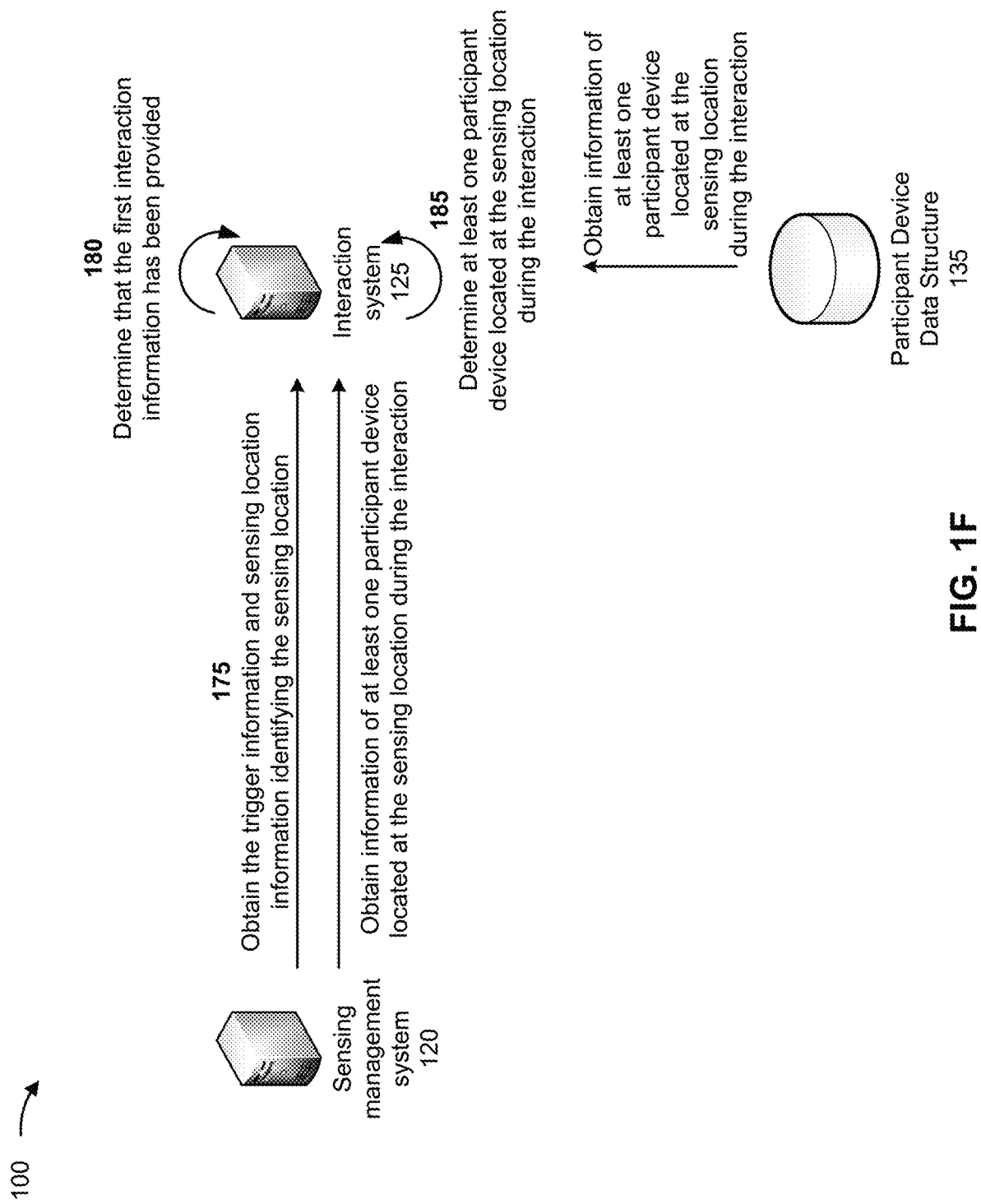

As shown in FIG. 1F, and by reference number 175, interaction system 125 may obtain the trigger information and sensing location information identifying the sensing location. For example, after determining the sensing location associated with facilitator device 105, sensing management system 120 may provide the trigger information and the sensing location identifying the sensing location to interaction system 125. Additionally, sensing management system 120 may provide time information identifying a date and/or a time when sensing management system 120 received the trigger information from sensing devices 115.

As shown in FIG. 1F, and by reference number 180, interaction system 125 may determine that the first interaction information has been provided. For example, interaction system 125 may determine that the trigger information includes the indication that interaction information (e.g., the first interaction information) has been provided. In response to the trigger information, interaction system 125 may determine that facilitator device 105 was located at the sensing location during the interaction.

In some implementations, interaction system 125 may determine particular interaction information that has been provided. For example, interaction system 125 may perform a lookup of the memory using the device information of facilitator device 105 and the time information associated with sensing management system 120 receiving the trigger information from sensing devices 115. Based on performing the lookup, interaction system 125 may obtain first interaction information and determine that the first interaction information has been provided.

As shown in FIG. 1F, and by reference number 185, interaction system 125 may determine at least one participant device 110 located at the sensing location during the interaction. In some implementations, interaction system 125 may perform a lookup of participant device data structure 135 using the sensing location information and the time information to determine at least one participant device 110 located at the sensing location during a period of time associated with the time information. Based on performing the lookup, interaction system 125 may obtain participant device information of any participant device 110 located at the sensing location during the period of time. In other words, interaction system 125 may obtain one or more records regarding one or more participant devices 110 located at the sensing location during the interaction. Interaction system 125 may modify participant device information (e.g., modify the one or more records) to indicate that the interaction information (e.g., the first interaction information) has been provided to the one or more participant devices 110 located at the sensing location. In situations, when modifying a record of a participant device 110 of a participant, interaction system 125 may advance a state of the participant with respect to a story arc in which the participant is participating. As an example, interaction system 125 may advance the state of the participant with respect to a story arc of media content (e.g., a video game), a role playing game, among other examples.

Additionally, or alternatively, to performing the lookup of participant device data structure 135, interaction system 125 may cause sensing management system 120 to obtain participant device information of any participant device 110 currently located at the sensing location. For example, interaction system 125 may provide a request to sensing management system 120 for the information identifying any participant device 110 currently located at the sensing location and sensing management system 120 may provide a request to the sensing devices 115 at the sensing location. The request to the sensing devices 115 may cause the sensing devices 115 at the sensing location to obtain the information of participant devices 110 currently located at the sensing location. Interaction system 125 may modify participant device information (of the participant devices 110) to indicate that the interaction information (e.g., the first interaction information) has been provided to the participant devices 110 located at the sensing location.

Figure 1G:
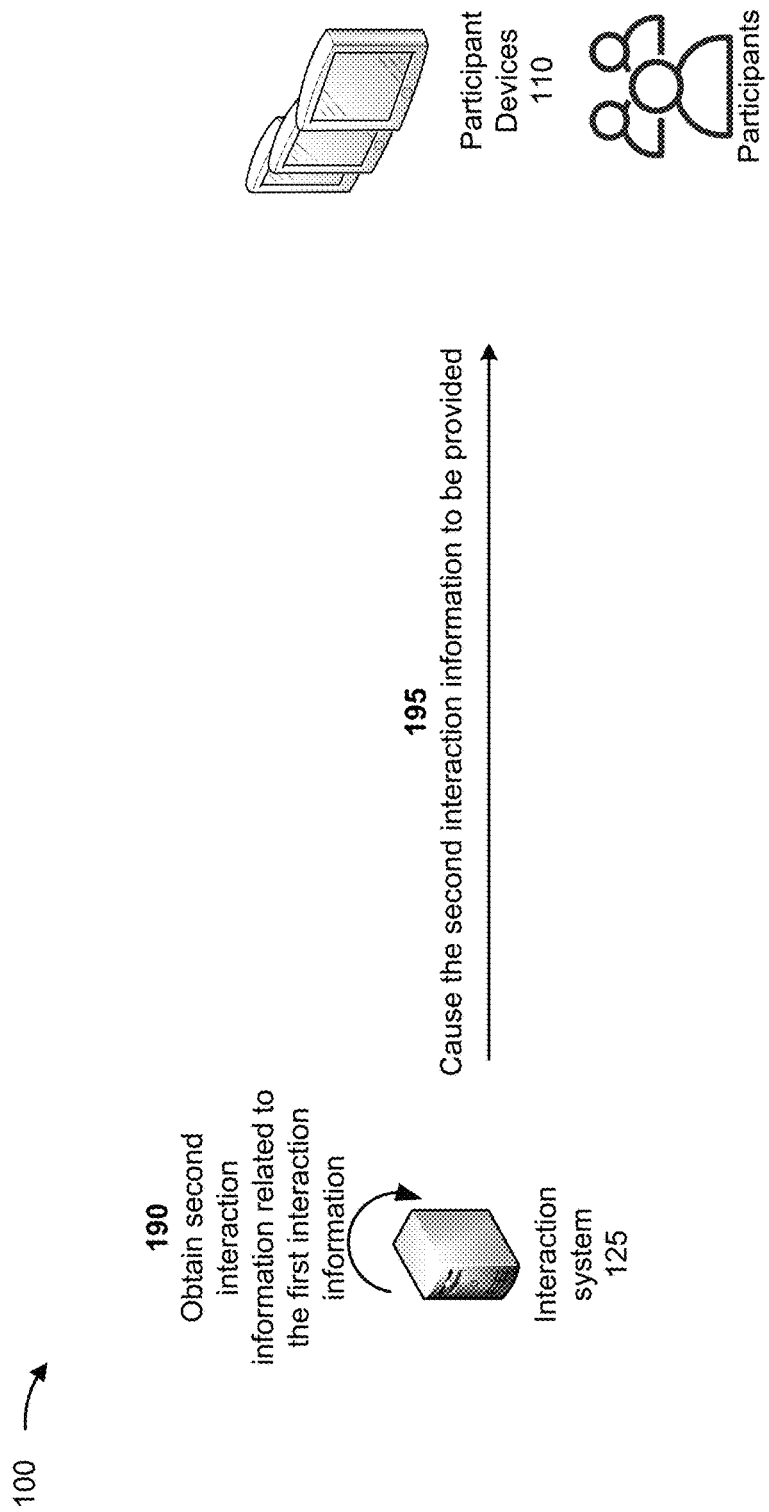

As shown in FIG. 1G, and by reference number 190, interaction system 125 may obtain second interaction information related to the first interaction information. In some implementations, based on receiving the trigger information, interaction system 125 may perform a lookup of the memory using the first interaction information and the time information associated with sensing management system 120. Based on performing the lookup, interaction system 125 may obtain the second interaction information related to the first interaction information.

As shown in FIG. 1G, and by reference number 195, interaction system 125 may cause the second interaction information interaction to be provided. "Second interaction information" is information (in the form of text, video, audio, special effects, actions, events and the like) that is designed to be delivered only after first interaction information has been delivered. Second interaction information may be a subsequent portion of a story in a role playing game, a subsequent portion of an itinerary, a reward (or an award) for completing all or part of a task, an incentive, an entitlement or the like. As an example, interaction system 125 may provide the second interaction information to modify a status in a game, to modify an itinerary, among other examples. Interaction system 125 may cause the second interaction information to be provided to the one or more participant devices 110.

In some examples, the second interaction information may be provided to the one or more participant devices 110 when the one or more participant devices 110 have moved to other locations of the venue (e.g., other sensing locations of the venue). For instance, based on the one or more participant devices 110 being detected at a particular location, the second interaction information may be provided to the one or more participant devices 110.

In some examples, the second interaction information may be provided to a facilitator device 105 of another facilitator located at a different location at the venue (e.g., a different sensing location). Based on the one or more participant devices 110 being detected at the location, the facilitator device 105 may prompt the other facilitator to interact with the one or more participants and provide the second interaction information to the one or more participants.

Interaction system 125 may perform one or more actions based on the trigger information. For example, based on obtaining the trigger information, interaction system 125 may control one or more operations of one or more devices located at the venue. For example, based on the one or more participant devices 110 being detected at a particular location and based on obtaining the trigger information, interaction system 125 may cause an object to move at the particular location, may cause a door to open at the particular location, may cause a device at the particular location to provide content related to the first interaction information, among other examples.

As explained herein, by determining the one or more participant devices that were located at the particular sensing location during the interaction, interaction system 125 may determine that the interaction information was provided by the facilitator to the one or more participants, associated with the one or more participant devices, during the interaction In this regard, interaction system 125 may create or modify a record indicating that the interaction occurred between the facilitator and the one or more participants and that the one or more participants received the first interaction information. Additionally, based on the record, interaction system 125 may determine content to be provided to the one or more participant devices 110. For instance, interaction system 125 may cause the second interaction information to be provided to one or more participant devices 110 during a period of time following the interaction. By identifying and providing the second interaction information, interaction system 125 may preserve the resources that would have been consumed by identifying and providing incorrect content. Additionally, or alternatively, based on the interaction information, interaction system 125 may control one or more operations of one or more devices located at the venue.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
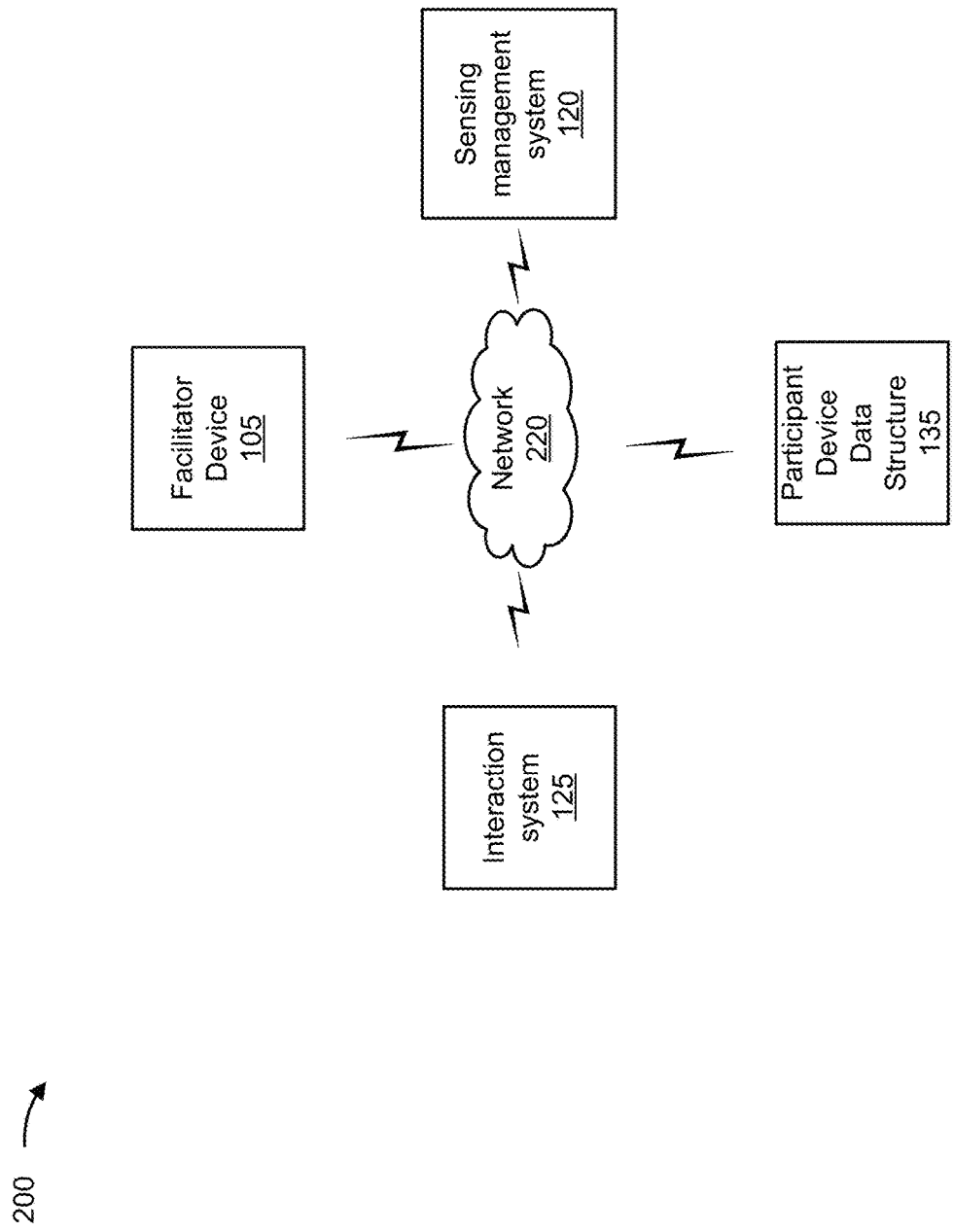
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an interactive system 125, which may include one or more elements of and/or may execute within a cloud computing system. Alternatively, interactive system 125 may include one or more elements of and/or may execute within an onsite computing environment (e.g., a non-cloud computing system). As further shown in FIG. 2, environment 200 may include facilitator device 105, sensing management system 120, interaction system 125, participant device data structure 135, and/or a network 220. Devices and/or elements of environment 200 may interconnect via wired connections and/or wireless connections.

In some situations, sensing management system 120 may include a server, such as an application server, a client server, a web server, a database server, a host server, a proxy server, a virtual server (e.g., executing on computing hardware), or a server in a cloud computing system. In some implementations, sensing management system 120 includes computing hardware used in a cloud computing environment. Alternatively, sensing management system 120 includes computing hardware used in an onsite computing environment.

In some situations, interactive system 125 may include a server, such as an application server, a client server, a web server, a database server, a host server, a proxy server, a virtual server (e.g., executing on computing hardware), or a server in a cloud computing system. In some implementations, interactive system 125 includes computing hardware used in a cloud computing environment. Alternatively, interactive system 125 includes computing hardware used in an onsite computing environment.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
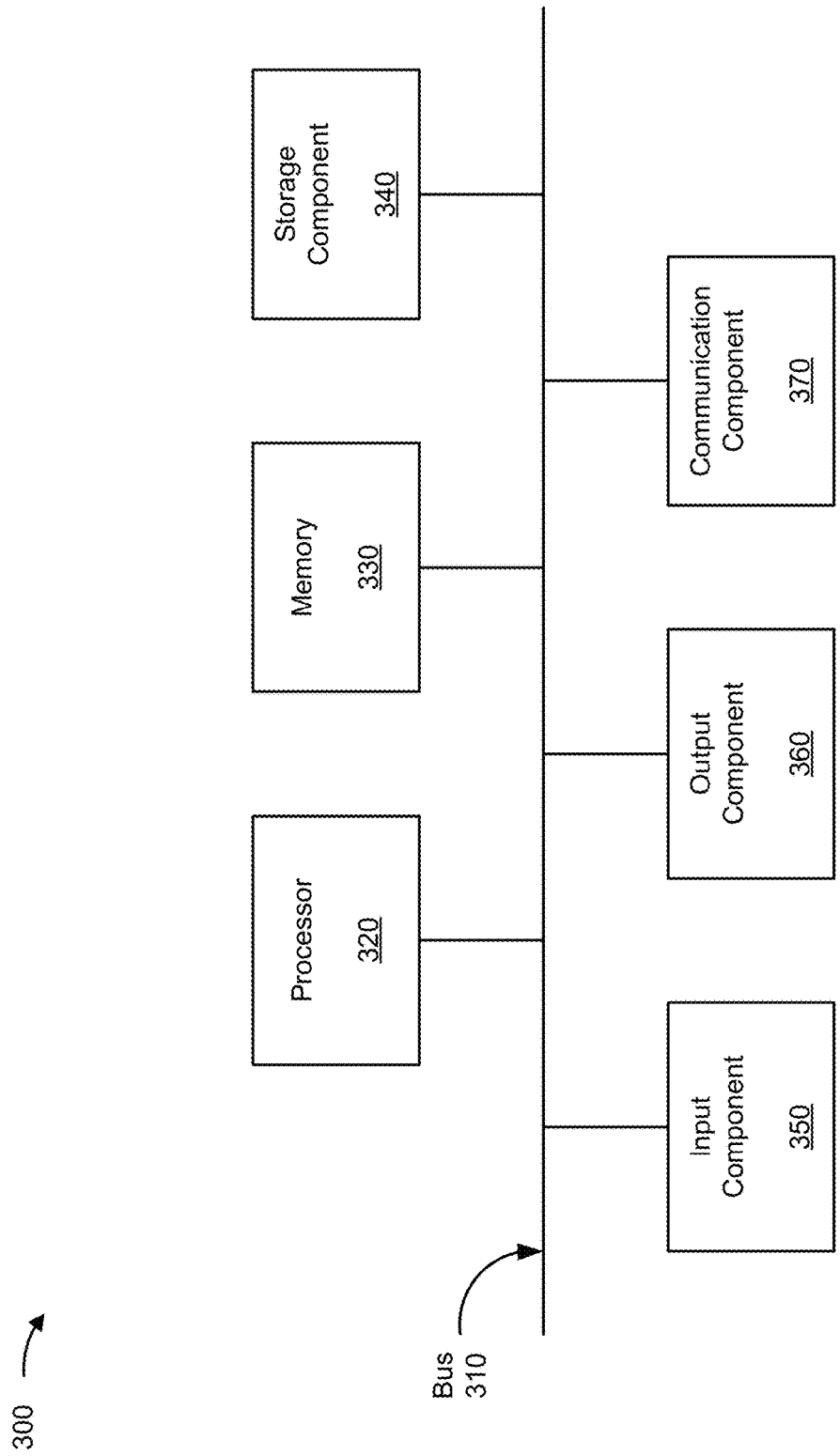
FIG. 3 is a diagram of example components of one or more devices of FIG. 2.

FIG. 3 is a diagram of example components of a device 300, which may correspond to facilitator device 105, participant device 110, sensing management system 120, and/or interaction system 125. In some implementations, facilitator device 105, participant device 110, sensing management system 120, and/or interaction system 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with providing content based on a trigger from a user device. In some implementations, one or more process blocks of FIG. 4 may be performed by an interaction system (e.g., interaction system 125). In some implementations, one or more process blocks of FIG. 4 may be performed by another device or a group of devices separate from or including the interaction system, such as a facilitator device (e.g., facilitator device 105), a participant device (e.g., participant device 110), and/or sensing management system 120 (e.g., sensing management system 120). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving trigger information associated with a facilitator device of a facilitator at a venue, wherein the trigger information is transmitted based on the facilitator operating the facilitator device during an interaction between the facilitator and one or more participants (block 410). For example, the interaction system may receive trigger information associated with a facilitator device of a facilitator at a venue, wherein the trigger information is transmitted based on the facilitator operating the facilitator device during an interaction between the facilitator and one or more participants, as described above. In some implementations, the trigger information is transmitted based on the facilitator operating the facilitator device during an interaction between the facilitator and one or more participants.

As further shown in FIG. 4, process 400 may include determining, based on receiving the trigger information, that interaction information has been provided to the one or more participants during the interaction (block 420). For example, the interaction system may determine, based on receiving the trigger information, that interaction information has been provided to the one or more participants during the interaction, as described above.

As further shown in FIG. 4, process 400 may include determining, in response to the trigger information, that the facilitator was located at a particular sensing location, of a plurality of sensing locations at the venue, during the interaction (block 430). For example, the interaction system may determine, in response to the trigger information, that the facilitator was located at a particular sensing location, of a plurality of sensing locations at the venue, during the interaction, as described above.

As further shown in FIG. 4, process 400 may include obtaining, using sensing location information identifying the particular sensing location, participant device information regarding at least one participant device located at the particular sensing location during the interaction (block 440). For example, the interaction system may obtain, using sensing location information identifying the particular sensing location, participant device information regarding at least one participant device located at the particular sensing location during the interaction, as described above.

As further shown in FIG. 4, process 400 may include modifying a record associated with at least one participant device to reflect that the interaction information was provided to at least one of the one or more participants associated with the at least one participant device (block 450). For example, the interaction system may modify a record associated with at least one participant device to reflect that the interaction information was provided to at least one of the one or more participants associated with the at least one participant device, as described above.

As further shown in FIG. 4, process 400 may include performing an action based on the modified record (block 460). For example, the interaction system may perform an action based on the modified record, as described above.

Process 400 may include additional implementations, such as any single implementation or any combination of implementations described below and/or in connection with one or more other processes described elsewhere herein.

In a first implementation, the interaction information is first interaction information, wherein performing the action comprises determining second interaction information related to the first interaction information, and identifying the least one participant device, and causing the second interaction information to be provided to the at least one participant device.

In a second implementation, determining the second interaction information comprises determining the second interaction information based on one or more of a period of time associated with a date and a time when the trigger information is received, the sensing location information identifying the particular sensing location, information identifying the facilitator device, or the first interaction information.

In a third implementation, the trigger information is received based on the facilitator interacting with a user interface of the facilitator device, wherein the trigger information includes the sensing location information, and wherein determining the particular sensing location comprises determining the particular sensing location based on the sensing location information.

In a fourth implementation, performing the action comprises one or more of controlling, based on the interaction information, one or more operations of one or more devices located at the venue, providing an incentive, providing an entitlement, providing an award, modifying status in a game, or modifying an itinerary.

In a fifth implementation, modifying the record comprises advancing a state of at least one participant with respect to a story arc in which the at least one participant is participating.

In a sixth implementation, receiving the trigger information comprises receiving the trigger information from a sensing management system, and wherein the method further comprises receiving the participant device information from the sensing management system prior to obtaining the participant device information, and storing the participant device information in a data structure prior to obtaining the participant device information, wherein the participant device information is obtained from the data structure based on receiving the trigger information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by an interaction system, the method comprising:
    receiving trigger information associated with a facilitator device of a facilitator at a venue,
        wherein the trigger information is transmitted based on the facilitator operating the facilitator device during an interaction between the facilitator and one or more participants;
    determining, based on receiving the trigger information, that interaction information has been provided to the one or more participants during the interaction;
    determining, in response to the trigger information, that the facilitator was located at a particular sensing location, of a plurality of sensing locations at the venue, during the interaction;
    obtaining, using sensing location information identifying the particular sensing location, participant device information regarding at least one participant device located at the particular sensing location during the interaction;
    modifying a record associated with at least one participant device to reflect that the interaction information was provided to at least one of the one or more participants associated with the at least one participant device; and
    performing an action based on the modified record.

2. The method of claim 1, wherein the interaction information is first interaction information,
    wherein performing the action comprises:
        determining second interaction information related to the first interaction information; and
        identifying the least one participant device; and
        causing the second interaction information to be provided to the at least one participant device.

3. The method of claim 2, wherein determining the second interaction information comprises:
    determining the second interaction information based on one or more of:
        a period of time associated with a date and a time when the trigger information is received,
        the sensing location information identifying the particular sensing location,
        information identifying the facilitator device, or
        the first interaction information.

4. The method of claim 1, wherein the trigger information is received based on the facilitator interacting with a user interface of the facilitator device, wherein the trigger information includes the sensing location information, and
wherein determining the particular sensing location comprises:
determining the particular sensing location based on the sensing location information.

5. The method of claim 1, wherein performing the action comprises one or more of:
controlling, based on the interaction information, one or more operations of one or more devices located at the venue;
providing an incentive;
providing an entitlement;
providing an award;
modifying status in a game; or
modifying an itinerary.

6. The method of claim 1, wherein modifying the record comprises:
advancing a state of at least one participant with respect to a story arc in which the at least one participant is participating.

7. The method of claim 1, wherein receiving the trigger information comprises:
receiving the trigger information from a sensing management system; and
wherein the method further comprises:
receiving the participant device information from the sensing management system prior to obtaining the participant device information; and
storing the participant device information in a data structure prior to obtaining the participant device information,
wherein the participant device information is obtained from the data structure based on receiving the trigger information.

8. A system, comprising:
a sensing management system configured to:
receive trigger information associated with a facilitator device of a facilitator at a venue,
wherein the trigger information is transmitted based on the facilitator operating the facilitator device during an interaction between the facilitator and a participant, and
determine, in response to the trigger information, that the facilitator device is located at a particular sensing location of a plurality of sensing location of the venue; and
an interaction system configured to:
receive, from the sensing management system, the trigger information and sensing location information identifying the particular sensing location,
obtain, using the sensing location information, participant device information regarding at least one participant device located at the particular sensing location during the interaction,
wherein the at least one participant device includes a participant device of the participant;
determine, based on receiving the trigger information, that first interaction information has been provided to the participant during the interaction;
modify a record associated with the at least one participant device to reflect that the interaction information was provided to at least one participant; and
provide second interaction information to the at least one participant device based on determining that the first interaction has been provided.

9. The system of claim 8, wherein the participant device information includes information identifying the participant device, and
wherein, to provide the second interaction information, the interaction system is configured to:
provide the second interaction information to the participant device based on the information identifying the participant device.

10. The system of claim 8, wherein the trigger information is received from a plurality of sensing devices, and
wherein, to determine that the facilitator device is located at the particular sensing location, the sensing management system is configured to:
determine a signal strength associated with the trigger information received from each sensing device of the plurality of sensing devices, and
determine that the facilitator device is located at the particular sensing location based on the signal strength associated with the trigger information received from each sensing device.

11. The system of claim 10, wherein, to determine that the facilitator device is located at the particular sensing location, the sensing management system is configured to:
identify a highest signal strength from the signal strength associated with the trigger information received from each sensing device of the plurality of sensing devices, and
determine that the trigger information is received from a particular sensing device, of the plurality of sensing devices, associated with the highest signal strength,
wherein the particular sensing device is provided at the particular sensing location.

12. The system of claim 8, wherein the trigger information includes information identifying the facilitator device; and
wherein the interaction system is further configured to:
obtain, using the information identifying the facilitator device, the second interaction information related to the first interaction information.

13. The system of claim 8, wherein the interaction system is further configured to:
obtain the second interaction information from a memory,
wherein the second interaction information is obtained based on information identifying a period of time associated with a date and a time when the trigger information is received.

14. The system of claim 8, wherein, to provide the second interaction information, the interaction system is configured to:
determine whether the second interaction information has been provided to the participant device within a time threshold from a time when the second interaction information is obtained from the memory or from a time when the trigger information is received.

15. The system of claim 8, wherein the particular sensing location includes one or more sensing devices,
wherein, to receive the trigger information, the sensing management system is configured to receive the trigger information from the one or more sensing devices, and
wherein the one or more sensing devices include at least one of a directional antenna or an omni directional antenna.

16. A non-transitory computer-readable medium storing a set of instructions, the set of instructions comprising:
one or more instructions that, when executed by one or more processors of a device, cause the device to:
store participant device information regarding a plurality of participant devices located at a venue;

receive trigger information associated with a facilitator device of a facilitator located at the venue,
  wherein the trigger information is received based on the facilitator interacting with the facilitator device during an interaction between the facilitator and a participant;
determine, based on the trigger information, that first interaction information was provided to the participant during the interaction;
determine, in response to the trigger information, that the facilitator was located at a particular sensing location, at the venue, during the interaction;
obtain, using sensing location information identifying the particular sensing location, a portion of the participant device information regarding at least one participant device located at the particular sensing location during the interaction,
  wherein the at least one participant device includes a participant device of the participant, and
  wherein the portion of the participant device information identifies the participant device of the participant; and
provide, to the participant device, second interaction information related to the first interaction information.

17. The non-transitory computer-readable medium of claim 16, wherein the one or more instructions, when executed by the one or more processors, further cause the device to:
  obtain, from a memory, the second interaction information based on information identifying a period of time associated with a date and a time when the trigger information is received.

18. The non-transitory computer-readable medium of claim 16, wherein the trigger information includes information identifying the facilitator device; and
  wherein the one or more instructions, when executed by the one or more processors, further cause the device to:
    obtain the second interaction information based on the information identifying the facilitator device.

19. The non-transitory computer-readable medium of claim 16, wherein the one or more instructions, when executed by the one or more processors, further cause the device to:
  control, based on the first interaction information, one or more operations of one or more devices located at the venue.

20. The non-transitory computer-readable medium of claim 16, wherein the one or more instructions, that cause the device to receive the trigger information, cause the device to:
  receive the trigger information, from a sensing management system, based on first Bluetooth low energy (BLE) advertisements provided by the facilitator device; and
  wherein the one or more instructions, when executed by the one or more processors, further cause the device to:
  receive the participant device information, from the sensing management system, based on second BLE advertisements provided by participant devices of the plurality of participants.

* * * * *